US008917182B2

(12) United States Patent
Chang et al.

(10) Patent No.: US 8,917,182 B2
(45) Date of Patent: Dec. 23, 2014

(54) SYSTEM AND METHOD FOR DETECTING AND PREVENTING DROWSINESS

(75) Inventors: Hsuan Chang, Los Altos, CA (US); Horace Craig Heller, Palo Alto, CA (US); Dennis A. Grahn, Palo Alto, CA (US)

(73) Assignees: Honda Motor Co., Ltd., Tokyo (JP); The Board of Trustees of the Leland Stanford Junior University, Palo Alto, CA (US)

( * ) Notice: Subject to any disclaimer, the term of this patent is extended or adjusted under 35 U.S.C. 154(b) by 76 days.

(21) Appl. No.: 13/490,044

(22) Filed: Jun. 6, 2012

(65) Prior Publication Data
US 2013/0328684 A1 Dec. 12, 2013

(51) Int. Cl.
*G08B 23/00* (2006.01)
*B60L 1/02* (2006.01)
*A61B 5/00* (2006.01)
*G08B 17/00* (2006.01)

(52) U.S. Cl.
USPC ........ 340/575; 340/576; 340/573.1; 219/204; 600/300; 600/301; 116/101

(58) Field of Classification Search
CPC ....................................... H05B 1/02
USPC ......................... 600/300; 219/204
See application file for complete search history.

(56) References Cited

U.S. PATENT DOCUMENTS

| 6,313,749 | B1* | 11/2001 | Horne et al. | 340/575 |
| 6,509,552 | B1* | 1/2003 | Roske et al. | 219/497 |
| 7,321,309 | B2 | 1/2008 | Cohen | |
| 7,875,066 | B2 | 1/2011 | Cohen et al. | |
| 7,924,142 | B2 | 4/2011 | Cohen et al. | |
| 2001/0030182 | A1* | 10/2001 | Haag et al. | 219/204 |
| 2002/0101354 | A1* | 8/2002 | Banas | 340/576 |
| 2006/0238359 | A1* | 10/2006 | Cohen | 340/573.4 |
| 2008/0045913 | A1 | 2/2008 | Johnson et al. | |
| 2008/0180235 | A1* | 7/2008 | Chang | 340/449 |
| 2010/0076273 | A1* | 3/2010 | Shigetou | 600/300 |
| 2010/0214087 | A1 | 8/2010 | Nakagoshi et al. | |
| 2011/0109462 | A1 | 5/2011 | Deng et al. | |

FOREIGN PATENT DOCUMENTS

| WO | WO 2006/115562 | 11/2006 |
| WO | WO 2008/020347 | 2/2008 |
| WO | WO 2008/072107 | 6/2008 |
| WO | WO 2009/007952 | 1/2009 |

* cited by examiner

*Primary Examiner* — Jennifer Mehmood
*Assistant Examiner* — Pameshanand Mahase
(74) *Attorney, Agent, or Firm* — Fenwick & West LLP; Mark E. Duell

(57) ABSTRACT

A system for preventing drowsiness in a driver by employing a thermal grill. The system includes a detection module and an intervention module. The detection module monitors a driver's parameters to determine whether the driver is drowsy. If the driver is determined to be drowsy, the intervention module activates a thermal grill with interlaced hot and cold regions. This activation causes the hot regions to approach one temperature and the cold regions to approach another. Additionally, this activation leads to an uncomfortable sensation for the driver, alerts the driver, and prevents the driver from getting drowsy.

17 Claims, 4 Drawing Sheets

SYSTEM AND METHOD FOR DETECTING AND PREVENTING DROWSINESS

BACKGROUND

1. Field of Disclosure

The disclosure generally relates to driver and vehicle safety, in particular to detecting and preventing drowsiness.

2. Description of the Related Art

Vehicle manufacturers today are developing various safety features for detecting sleep onset and then alerting the driver. For example, the prior art systems blow air on the driver's face or play an alert sound to alert a drowsy driver. However, such mechanisms of alerting the driver have limited transient effect.

SUMMARY

Embodiments of the invention prevent drowsiness in a driver by employing a thermal grill. The disclosed system includes a detection module and an intervention module. The detection module determines whether a driver is drowsy based on one or more parameters associated with the driver. Examples of these parameters include the driver's steering angle, steering movement, speed and acceleration employed by the driver while driving.

If the detection module determines the driver to be drowsy, the detection system informs the intervention module about the driver's drowsiness. Consequently, the intervention module activates a thermal grill comprising of interlaced hot and cold regions. Upon activation, the hot regions are heated or set to a first temperature and the cold regions are cooled or set to a second temperature. Such activation induces an uncomfortable sensation in the driver's body part that is in contact with the thermal grill. This uncomfortable sensation alerts the driver. In one embodiment, the alerting stimulus provided by the uncomfortable sensation prevents the driver from getting drowsy. In one embodiment, the thermal grill is located on the steering wheel and is in contact with the driver's palm.

Other embodiments of the invention include computer-readable medium that store instructions for implementing the above described functions of the system, and computer-implemented method that includes steps for performing the above described functions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The computing environment described herein detects and prevents drowsiness in a driver. The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
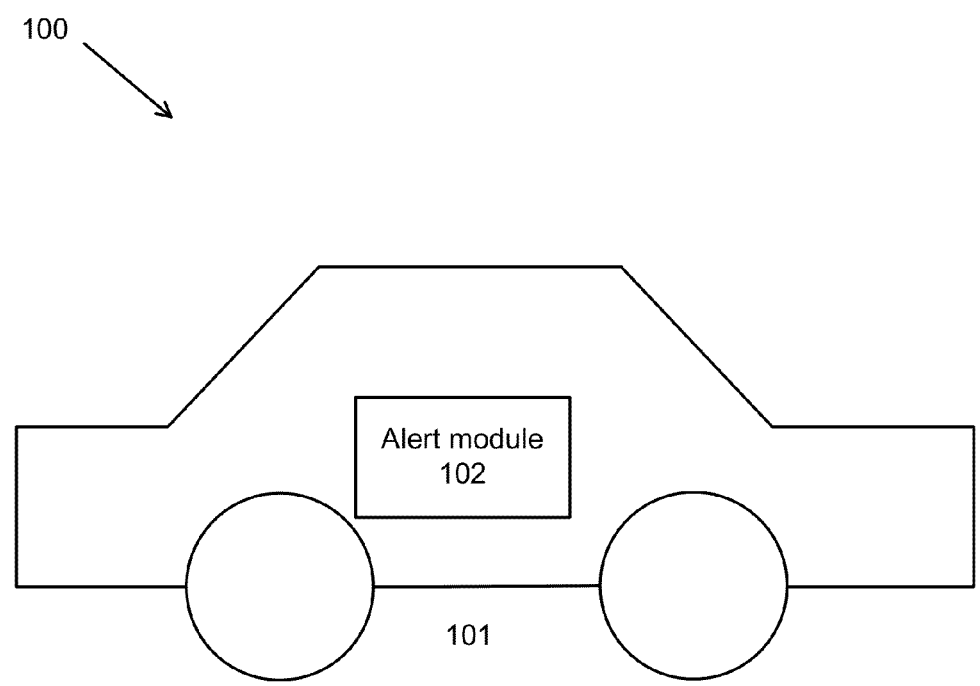
FIG. 1 is a block diagram illustrating a computing environment for detecting and preventing drowsiness onset according to one embodiment.

Referring to FIG. 1, the computing environment 100 for detecting and preventing driver drowsiness comprises an alert module 102. In one embodiment, the alert module 102 is located in vehicle 101 driven by the driver. In another embodiment, the alert module 102 is located in a remote location and the alert module 102 wirelessly communicates with various sensors and other components in vehicle 101. Regardless of the location of the alert module 102, the alert module 102 monitors various parameters described below, detects drowsiness onset, and prevents the driver from falling asleep on the wheel.

To prevent the driver from falling asleep, the alert module 102 activates a Thunberg Thermal Grill (hereinafter referred to as "TTG") in contact with the driver. The TTG, also known as thermal grill, is further described in U.S. Pat. No. 7,321,309, which is incorporated by reference. The TTG is located in the vehicle 101 such that it is in contact with the driver. For example, the TTG can be located on the steering wheel such that the TTG is in contact with part of the driver's palms. The TTG comprises interlaced warm and cold regions or bars. In one embodiment, the alert module 102 activates the TTG such that the temperature of the warm bars is approximately 40 degrees Celsius and the temperature of cold bars is approximately 20 degrees Celsius. The activated TTG produces an uncomfortable or painful sensation for the driver. In one embodiment, the uncomfortable sensation is an icy hot sensation. The WIPO publication WO 2009/007952 provides additional details and examples of this sensation produced by the TTG, and this WIPO publication WO2009/007952 is incorporated herein by reference. This TTG induced sensation alerts the driver and prevents the driver from falling asleep. Moreover, this TTG induced sensation does not create long term harmful effects for the driver and the sensation has a longer lasting effect on the driver than transient mechanisms like blowing air on the driver's face. Accordingly, the alert module 102 beneficially employs TTG to alert the driver for longer periods of time without causing long term harm to the driver. The alert module 102 is further described in FIG. 2 below.

Figure 2:
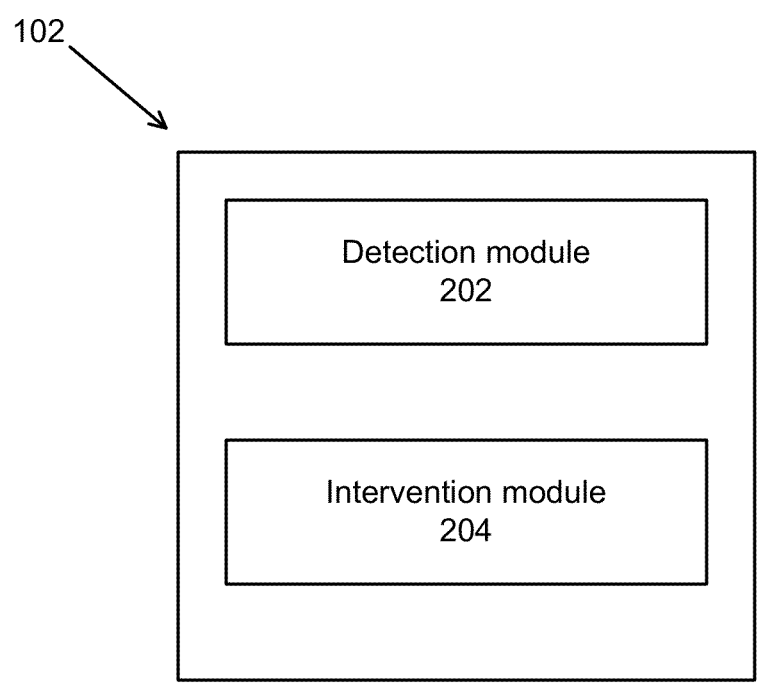
FIG. 2 is a block diagram illustrating a driver alert module according to one embodiment.

As illustrated in FIG. 2, the alert module 102 comprises a detection module 202 and an intervention module 204. The detection module 202 monitors the driver's parameters to detect drowsiness onset stage. As described below, the detection module 202 determines that a driver has entered a drowsiness onset stage based on movement of the steering wheel in the vehicle, or acceleration or speed of the vehicle. In other embodiments, the detection module 202 determines that a driver has entered a drowsiness onset stage based on images of the driver's pupil, eyelids and/or head, or based on readings about driver's physiology.

In one embodiment, the detection module 202 is communicatively coupled to an image capturing system (not shown). The image capturing system captures images of the driver's pupil, driver's eyelids, and/or driver's head movement. The detection module 202 receives the captured images and determines whether the driver is drowsy based on driver's pupil dilation activity, blink rate and head movement. Additionally, in some embodiments, the detection module 202 receives, from various sensors in the vehicle, readings about driver's pertinent physiology signs. For example, the detection module 202 receives Electroencephalography (EEG) measurements, Electromyography (EMG) measurements, or Electrocardiograph (ECG) measurements for the driver. The detection module 202 receives one or more of these measurements and compares these measurements with previously stored measurements indicating drowsiness. Based on the comparison, the detection module 202 determines whether the driver has entered the drowsiness onset stage.

Additionally, in one embodiment, the detection module 202 accounts for vehicle readings to determine whether the driver is drowsy. Accordingly, the detection module 202 receives measurements indicating steering angle, steering movement, lane-keeping feedback, acceleration, or speed. Based on these measurements, the detection module 202 determines whether the driver has entered the drowsiness onset state. For example, if measurements about the steering movement and the lane-keeping feedback indicates that the vehicle has been swerving, or if speed measurements indicate that the driver has been driving at a constant speed for a predetermined amount of time (e.g. for five minutes or seven minutes), the detection module 202 determines that the driver has entered the drowsiness onset state.

Regardless of how the detection module 202 determines that the driver has entered the drowsiness onset state, the detection module 202 transmits a signal to the intervention module 204 informing the module 204 that the driver has entered the drowsiness onset state.

Figure 4A:
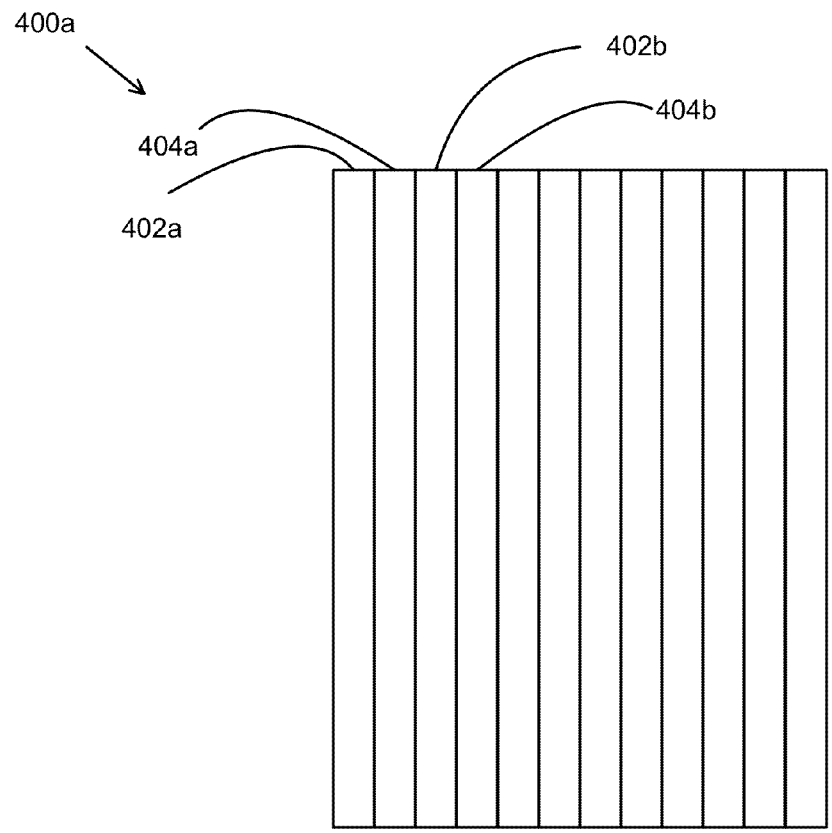
FIG. 4A is a block diagram illustrating a thermal grill for preventing drowsiness onset according to one embodiment.
Figure 4B:
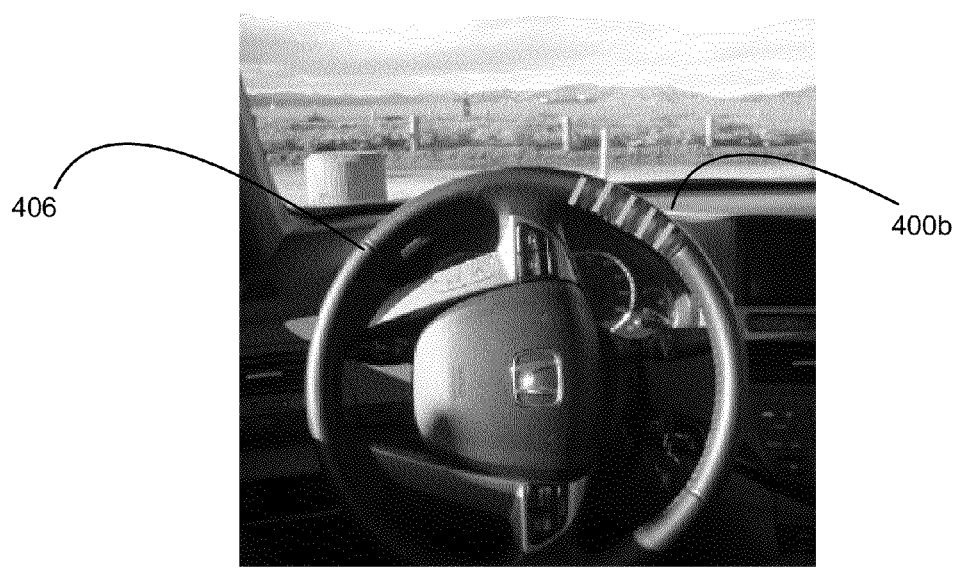
FIG. 4B is a block diagram illustrating a thermal grill mounted on a steering wheel for preventing drowsiness onset according to one embodiment.

The intervention module 204 receives the signal from the detection module 202 and activates TTG in contact with the driver. FIG. 4A illustrates an example of TTG. As illustrated in FIG. 4A, TTG 400a comprises alternating hot regions 402a-b and cold regions 404a-b. TTG 400a may be mounted in various locations in the vehicle 101 such that TTG is in contact with the driver. FIG. 4B illustrates one such location wherein, according to one embodiment, TTG 400b is located on the steering wheel 406 of the vehicle according to one embodiment. Placing TTG on steering wheel 406 beneficially places TTG 406 in constant contact with driver's palms and allows TTG to alert the driver when directed to do so by the intervention module 204.

Referring back to FIG. 2, the intervention module 204 transmits a signal to TTG or a temperature regulator (not shown) indicating activation of TTG. The signal causes the temperature of the hot bars or regions in TTG to approach or reach a first temperature, and the temperature of cold bars or regions to approach or reach a second temperature. In one embodiment, the first temperature and second temperature differ by at least 10 degrees Celsius. In another embodiment, the first temperature is within 35-42 degrees Celsius and the second temperature is within 15-27 degrees Celsius. In one embodiment, the temperature in TTG regions is regulated through warm and cold thermally conductive solution running under the surface of TTG. In another embodiment, the temperature in TTG regions is regulated through other known techniques for regulating temperature.

As the hot and cold regions in TTG approach their desired temperatures, the part of the driver in contact with TTG perceives an uncomfortable sensation like an icy hot sensation or a sensation received from an electric shock or a sting. This sensation beneficially alerts the driver and prevents the driver from falling asleep on the wheel.

After the intervention module 204 has activated TTG and alerted the driver, the module 204 deactivates TTG. To deactivate, the intervention module 204 transmits a deactivate signal that directs TTG, directly or through an intermediary, to return its hot and cold region to their steady state or neutral temperatures. In one embodiment, the steady state temperatures for both regions are the ambient temperature in the vehicle or normal human skin temperature that is approximately 33 degrees Celsius.

In one embodiment, the intervention module 204 deactivates TTG after a predetermined amount of time has elapsed since the intervention module 204 activated TTG. In another embodiment, the intervention module 204 receives temperature readings from hot and cold regions of TTG, and the intervention module 204 deactivates TTG after the regions have approximately or accurately attained their desired temperature for a predetermined amount of time. After the intervention module 204 deactivates TTG, the hot and cold regions in TTG return to their steady state temperatures. Such deactivation of TTG, after a predetermined amount of time since activation, beneficially ensures that the driver does not get acclimated to sensation produced by activated TTG. Accordingly, deactivation beneficially ensures that later activation still produces the uncomfortable sensation for the driver.

In one embodiment, the intervention module 204 activates TTG after the driver has been driving the vehicle for a predetermined amount of time (for e.g., three hours), or activates the TTG at a particular time of day (for e.g., 6 pm). In another embodiment, the intervention module 204 repeatedly activates and deactivates TTG for a predetermined amount of time. The repeated activation and deactivation further alerts the driver by repeatedly inducing the uncomfortable sensation for the driver. In one embodiment, the intervention module 204 does not repeatedly activate and deactivate the TTG after receiving an input signal from the driver indicating that the driver is alert. The driver may provide this input signal by pressing a button (not shown) or through another input means present in the vehicle.

Drowsiness Detection and Prevention Methodology

Figure 3:
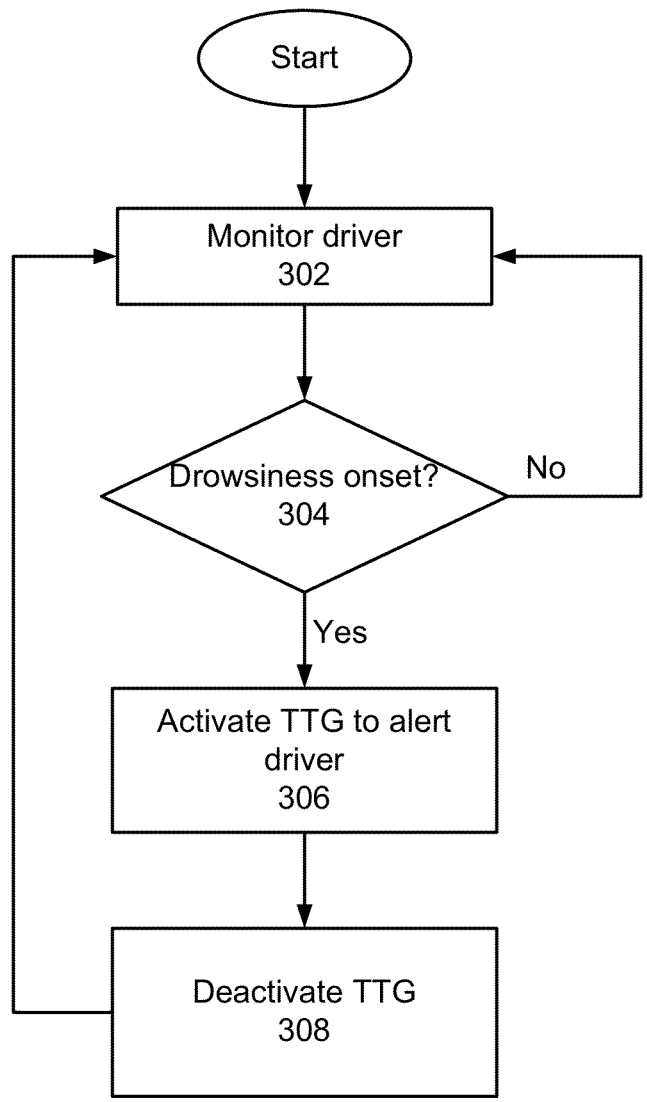
FIG. 3 is a flow diagram illustrating a method for detecting and preventing drowsiness onset according to one embodiment.

FIG. 3 is a flow diagram illustrating a method for preventing drowsiness onset in a driver. The driver enters the vehicle 101 and the alert module 102 begins 302 monitoring the driver. Next, the alert module 102 receives various parameters from one or more sensors in vehicle 101 and determines 304 based on received parameters whether the driver is entering a drowsiness onset stage. If yes, the alert module 102 activates 306 the TTG to alert the driver. Otherwise, the alert module 102 keeps 302 monitoring the driver. If the alert module activates 306 the TTG, the alert module next deactivates 308 the TTG after the driver has been alerted.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. One of ordinary skill in the art will understand that the hardware, implementing the described modules, includes at least one processor and a memory, the memory comprising instructions to execute the described functionality of the modules.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for preventing drowsiness in a driver of a vehicle, the method comprising:
    using a processor and a memory to execute steps comprising:
        monitoring one or more parameters associated with the driver;
        determining whether the driver is drowsy based on the monitored parameters associated with the driver; and
        responsive to determining that the driver is drowsy, activating a thermal grill located on an outermost surface of a steering wheel of the vehicle such that at least a portion of the thermal grill is exposed on the outermost surface of the steering wheel, the thermal grill comprising interlaced regions, wherein activating the thermal grill results in two adjacent regions approaching two different temperatures.

2. The computer-implemented method of claim 1, further comprising:
    determining whether an amount of time has elapsed since activation of the thermal grill; and
    responsive to determining that the amount of time has elapsed, deactivating the thermal grill.

3. The computer-implemented method of claim 1, wherein the steps of activating and deactivating the thermal grill are repeated until receiving an input indicating that the driver is alert.

4. The computer-implemented method of claim 1, wherein temperatures of the two adjacent regions is separated by at least ten degrees Celsius.

5. The computer-implemented method of claim 1, wherein the thermal grill is in physical contact with a palm of the driver.

6. The computer-implemented method of claim 1, wherein each interlaced region extends radially outward from a center of the steering wheel.

7. The computer-implemented method of claim 1, wherein the determination of whether the driver is drowsy is based on one or more of: a steering angle measurement, a steering movement measurement, lane-keeping feedback, an acceleration measurement, and a speed measurement.

8. A computer program product for preventing drowsiness in a driver of a vehicle, the computer program product comprising a non-transitory computer-readable storage medium including computer program code for:
    monitoring one or more parameters associated with the driver;
    determining whether the driver is drowsy based on the monitored parameters associated with the driver; and
    responsive to determining that the driver is drowsy, activating a thermal grill located on an outermost surface of a steering wheel of the vehicle such that at least a portion of the thermal grill is exposed on the outer surface of the steering wheel, the thermal grill comprising interlaced regions, wherein activating the thermal grill results in two adjacent regions approaching two different temperatures.

9. The computer program product of claim 8, further including computer program code for:
    determining whether an amount of time has elapsed since activation of the thermal grill; and
    responsive to determining that the amount of time has elapsed, deactivating the thermal grill.

10. The computer program product of claim 8, wherein the steps of activating and deactivating the thermal grill are repeated until receiving an input indicating that the driver is alert.

11. The computer program product of claim 8, wherein temperatures of the two adjacent regions is separated by at least ten degrees Celsius.

12. The computer program product of claim 8, wherein the thermal grill is in physical contact with a palm of the driver.

13. A computer system for preventing drowsiness in a driver of a vehicle, the computer system comprising a processor and a non-transitory computer readable medium, the non-transitory computer readable medium including computer program code for:
    monitoring one or more parameters associated with the driver;
    determining whether the driver is drowsy based on the monitored parameters associated with the driver; and responsive to determining that the driver is drowsy, activating a thermal grill located on an outermost surface of a steering wheel of the vehicle, the thermal grill exposed on the outermost surface of the steering wheel, the thermal grill comprising interlaced regions, wherein activating the thermal grill results in two adjacent regions approaching two different temperatures.

14. The computer system of claim 13, further including computer program code for:
   determining whether an amount of time has elapsed since activation of the thermal grill; and
   responsive to determining that the amount of time has elapsed, deactivating the thermal grill.

15. The computer system of claim 13, wherein the steps of activating and deactivating the thermal grill are repeated until receiving an input indicating that the driver is alert.

16. The computer system of claim 13, wherein temperatures of the two adjacent regions is separated by at least ten degrees Celsius.

17. The computer system of claim 13, wherein the thermal grill is in physical contact with a palm of the driver.

\* \* \* \* \*

UNITED STATES PATENT AND TRADEMARK OFFICE
CERTIFICATE OF CORRECTION

PATENT NO.         : 8,917,182 B2                                            Page 1 of 1
APPLICATION NO.    : 13/490044
DATED              : December 23, 2014
INVENTOR(S)        : Hsuan Chang, Horace Craig Heller and Dennis A. Grahn It is certified that error appears in the above-identified patent and that said Letters Patent is hereby corrected as shown below:

In the claims

Claim 4, column 6, line 15, delete "regions is separated" and "insert --regions are separated--.
Claim 11, column 6, line 55, delete "regions is separated" and insert --regions are separated--.
Claim 16, column 7, line 18, delete "regions is separated" and insert --regions are separated--.

Signed and Sealed this
Fifth Day of January, 2016

Michelle K. Lee
*Director of the United States Patent and Trademark Office*